US007139789B2

(12) United States Patent
Evans

(10) Patent No.: US 7,139,789 B2
(45) Date of Patent: Nov. 21, 2006

(54) ADDER INCREMENT CIRCUIT

(75) Inventor: Richard J. Evans, Bristol (GB)

(73) Assignee: Broadcom Corporation, Irvine, CA (US)

( * ) Notice: Subject to any disclaimer, the term of this patent is extended or adjusted under 35 U.S.C. 154(b) by 500 days.

(21) Appl. No.: 10/252,045

(22) Filed: Sep. 23, 2002

(65) Prior Publication Data

US 2003/0061253 A1   Mar. 27, 2003

Related U.S. Application Data

(60) Provisional application No. 60/324,087, filed on Sep. 24, 2001.

(51) Int. Cl.
*G06F 7/50* (2006.01)

(52) U.S. Cl. ...................................... 708/711

(58) Field of Classification Search ......... 708/710–714
See application file for complete search history.

(56) References Cited

U.S. PATENT DOCUMENTS

| 4,682,303 A * | 7/1987 | Uya ........................... 708/714 |
| 4,764,887 A * | 8/1988 | Lai et al. ..................... 708/711 |
| 5,007,010 A | 4/1991 | Flora |
| 5,276,635 A | 1/1994 | Naini et al. |
| 5,278,783 A * | 1/1994 | Edmondson ................ 708/711 |
| 5,477,480 A * | 12/1995 | Inui ............................ 708/711 |
| 5,487,025 A * | 1/1996 | Partovi et al. .............. 708/714 |
| 5,500,813 A * | 3/1996 | Song et al. ................. 708/712 |
| 6,529,931 B1 * | 3/2003 | Besz et al. .................. 708/711 |

FOREIGN PATENT DOCUMENTS

| GB | 2 263 002 A | 7/1993 |
| GB | 2 342 193 | 4/2000 |

OTHER PUBLICATIONS

Simon Knowles, "A Family of Adders", *IEEE*, pp. 30-37, 1999.
European Search Report, dated Aug. 1, 2005, for European Patent Appl. No. 02256594.9, 3 pages.

* cited by examiner

*Primary Examiner*—Tan V. Mai
(74) *Attorney, Agent, or Firm*—Sterne, Kessler, Goldstein & Fox PLLC

(57) ABSTRACT

In association with a circuit for adding binary numbers, it is often useful to increment the sum by a value of 1, for example on a conditional basis. Each of the combined adder and incrementer circuits embodying the invention also provides an output indicating whether a CarryOut signal resulted from the incrementing operation, or whether the CarryOut signal resulted from the addition. The preferred embodiments utilize prefix-type adder circuits using a single carry chain. Alternate embodiments generate a CarryOut signal as a function of the incrementing operation, using either generate and propagate signals or from generate and kill signals from the carry chain.

10 Claims, 9 Drawing Sheets

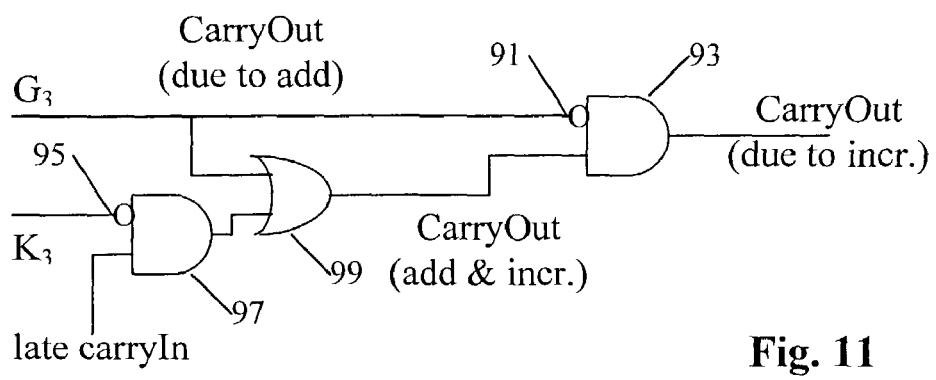
Fig. 11
Fig. 12
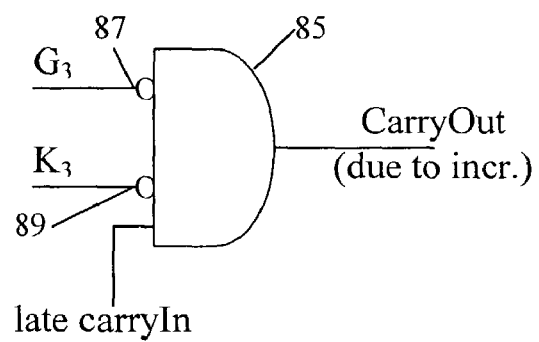

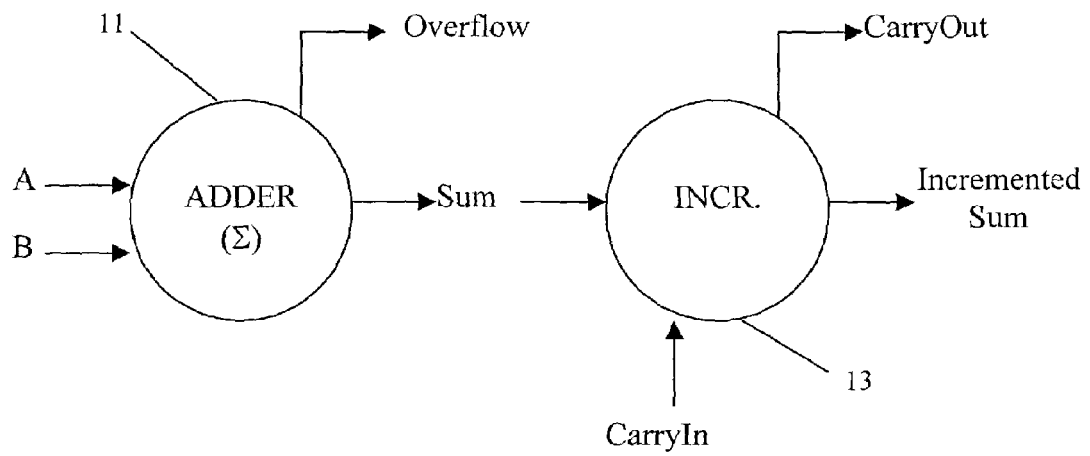
Fig. 13 - Prior Art
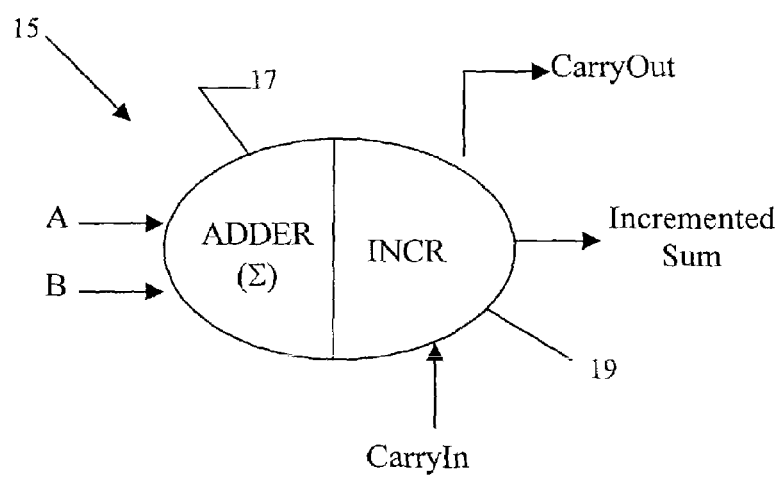
Fig. 14 - Prior Art

ADDER INCREMENT CIRCUIT

CROSS REFERENCE TO RELATED CASE

This application claims priority to Provisional U.S. Patent Application No. 60/324,087, filed Sep. 24, 2001, which is incorporated herein by reference in its entirety.

FIELD OF THE INVENTION

The inventive concepts relate to circuits and methods for adding binary numbers and conditionally incrementing the result, and more specifically to such techniques that are also capable of discriminating whether a carry output was caused by the addition operation or was generated by the incrementing function.

BACKGROUND

Logic circuits for performing addition operations find many uses in Integrated Circuits (ICs), such as the circuits used in computers. For example, adders may be used to calculate addresses. Many applications for adder circuits also require an increment to be applied to the sum of the addition, for example to reflect a carry-in signal from another stage or circuit. In one particular example, an adder/incrementer circuit may be used as part of the back-end of a multiplier, to add two shifted numbers and perform a conditional increment, based on whether or not there is a need to round-up the resultant sum.

FIG. 13 provides a logical diagram of such an addition and conditional incrementer operation, preferably using a prefix adder type of circuitry. The illustrated circuit comprises an adder 11 and an incrementer 13, both of which may be implemented as prefix addition circuits. Prefix adders are binary adder circuits that compute the carries for the bit positions based on prefix equations. Prefix adders are described, for example, in Knowles, *A Family of Adders*, Element 14, Bristol, UK. [Proceedings of the 14$^{th}$ IEEE Symposium on Computer Arithmetic, pp. 30–34, Adelaide, Australia, April 1999] The logic needed to implement the carry chain in such an adder may be viewed as a prefix graph, illustrating the logical interconnection of the layers of the chain.

The adder (Σ) 11 adds two n-bit binary numbers A and B to produce an n-bit result (Sum) and an overflow or carry out bit (Overflow in the drawing). For some applications, the sum is incremented by adding a binary value of 1. For an application where it is desired to increment the value of the resultant Sum based on a conditional input (CarryIn), the illustrated incrementer 13 adds the conditional binary input value (CarryIn) to the Sum from the adder 11. As a result, the incrementer 13 produces a new n-bit result (IncrementedSum) and a new overflow or carry out bit (CarryOut in the drawing).

In some applications, the overflow bit from the adder 11 may be discarded. However, for an application where there is a need to determine the basis for the final carry out bit (CarryOut) associated with the IncrementedSum, it is possible to examine the value of the Overflow signal from the adder 11.

The implementation illustrated in FIG. 13, however, is not efficient, because the path through the adder 11 and the incrementer 13 passes through two n-bit wide carry chains, which requires a substantial amount of logic circuitry and introduces considerable delay. One solution to simplify the logic and reduce delay is to merge the incrementer with the adder into a single logic block 15, as illustrated in FIG. 14. In such an implementation, the incrementer 19 shares the carry chain (not separately shown) of the adder 17, and as such, requires only one stage of logic delay for the carry functions. This logical diagram shows the general form of the adder/incrementer 15, without showing the details. The logic circuitry for implementing the combined adder/incrementer 15 may be similar to a late carry in adder, which is one of the embodiments disclosed in published UK Patent Application No. (GB) 2342193 (published Apr. 5, 2000).

As noted, it is useful in some applications of the adder and incrementer to know the cause of the final CarryOut, and if the circuit is built as separate addition and incrementing circuits (FIG. 13), there is no problem in discriminating between the carry produced by the two separate operations. However, in the faster combined circuit 15 (FIG. 14), there is one problem. In such a circuit, the new CarryOut bit is not a function solely of any carry generated by the incrementer function. Instead, the new CarryOut bit may is a function of both the addition and the incrementing operation. Hence, there is a need for a combined adder/incrementer circuit that will also provide a signal indicative of the cause of the final CarryOut. Preferably, such a circuit should provide a CarryOut bit that depends solely on whether or not a carry signal is generated by the incrementer function.

SUMMARY OF THE INVENTION

Preferred embodiments seek to satisfy the above stated needs relating to a combined adder and incrementer circuit with additional logic to enable discrimination between the carry produced by the two functions.

The preferred techniques involve merging the incrementing and adding functions together using a 'late-incrementer' structure, to minimize delay. Logic circuitry is added to this late-incrementer to discriminate between the carry produced by the addition and that produced by incrementing the result. This discriminating logic evaluates in parallel with the final output stage producing the sum, so that the path from input to carry out is no longer than that from the inputs to the upper most sum produced by a normal late-incrementer.

Inventive aspects relate to adder-incrementer circuits and to combined methodologies for adding and incrementing two binary numbers. For example, one circuit aspect of the present invention includes a carry chain of logic circuits, for producing two sets of summation carry terms relative to bit positions of a sum of the two binary numbers. At least one output stage logic circuit is coupled to outputs of the carry chain. The one or more output stages process the summation carry terms from the carry chain with respect to a value of a conditional increment signal. As a result of this processing, the adder-incrementer circuit selectively outputs either the sum of the binary numbers or the incremented sum of the binary numbers. The inventive circuit also includes a carry-logic gate. This gate logically processes the value of the conditional increment signal and a bit of one or more of the sets of summation carry terms from the carry chain. The carry-logic gate produces a carry output signal dependent on a carry result, if any is generated by incrementing of the sum of the binary numbers.

In a more specific example, the adder-incrementer includes a first stage logic circuit receiving the first binary number (A) and the second binary number (B). This first stage circuit processes each pair of respective bits (Am) and (Bm) from the binary numbers (A, B) to generate at least two intermediate carry-into terms. Disclosed embodiments produce carry generate (g), carry propagate, and carry kill (k) terms from the bit-positions of the input binary numbers. The carry chain is coupled to receive at least two sets of the intermediate carry terms from the first stage logic circuit, for example the g and k terms or the g and p terms. The carry chain preferably implements a prefix graph type carry chain computation on these received signals to generate two sets of summation carry terms relative to bit positions of a sum of the first and second binary numbers. In one preferred embodiment, the carry chain produces generate (G) and propagate (P) terms, whereas in the other preferred embodiment, the carry chain produces generate (G) and kill (K) terms.

The preferred embodiment of the subsequent logic stages includes a second stage logic circuit, coupled to outputs of the carry chain. The second stage logic circuit processes summation carry terms from the chain with respect to an increment signal, preferably a conditional increment signal. This logic stage produces a set of output carry signals (G') with respect to bit positions of the incremented sum of the first and second binary numbers. Output logic gates then combine the set of output carry signals (G') with a set of intermediate carry terms, for example propagate (p) terms, from the first stage logic circuit to generate an output related to the sum of the first and second binary numbers. Where the increment signal is a conditional signal, such as a late carryIn signal, the output will be the sum of the numbers if the value of the increment signal is 0. In any such preferred embodiment, the output will be an increment of the sum of the numbers if the value of the increment signal is 1.

The carry-logic gate processes the increment signal and a predetermined bit of at least one of the sets of summation carry terms from the carry chain, for example, a highest order bit of the P terms or highest order bits from the G and K terms. The gate produces a carry indicator signal dependent on the cause of any carry output. In the preferred embodiments, this gate outputs a carryOut signal that indicates whether or not the increment operation caused the carry-out.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 11 is a block diagram of gate circuitry for generation of the carry output signal in a 4-bit wide exemplary embodiment of the circuit of FIG. 10.

FIG. 12 is a block diagram of a reduced version of the gate circuitry of FIG. 12.

FIG. 13 is a logical/functional diagram of a prior art device comprising a separate adder circuit and incrementer circuit.

FIG. 14 is a logical/functional diagram of a prior art combined adder and incrementer circuit.

DETAILED DESCRIPTION OF THE PREFERRED EMBODIMENTS

The various aspects of the invention disclosed herein relate to a combined adder and incrementer circuit, preferably in the form of a late-incrementing prefix adder. A minimal amount of logic is added into the circuit so that this combined adder and incrementer can still provide a signal to discriminate between the carry produced by the adder and the carry produced by the incrementer function. Reference now is made in detail to the presently preferred embodiments of the invention, examples of which are illustrated in the accompanying drawings and discussed below.

Figure 1:
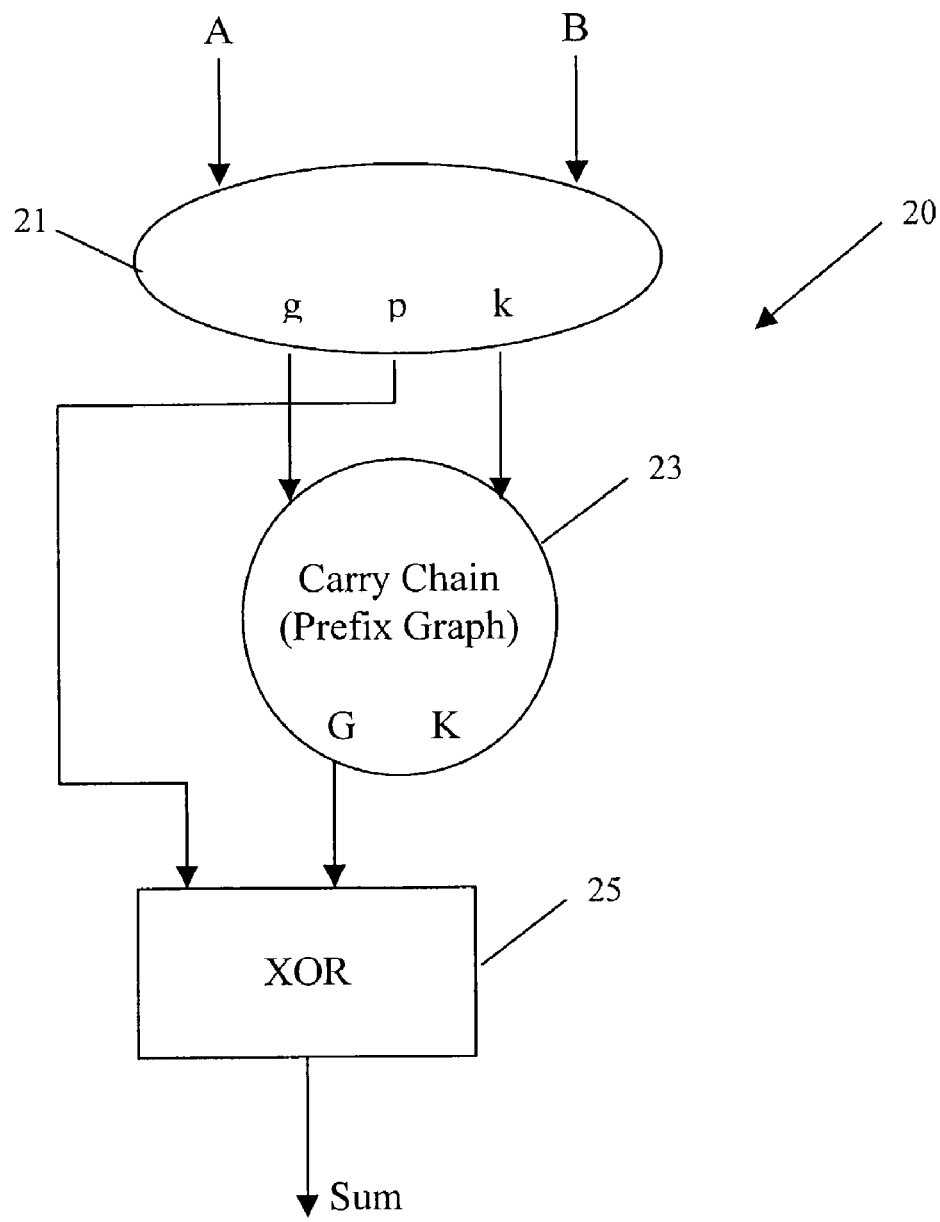
FIG. 1 is a logical/functional diagram of a prefix adder, which may be used as part of an implementation of the present invention.

To understand how the carry discrimination can be achieved, it may be helpful first to consider the structure of the adder. FIG. 1 illustrates the general form of the prefix graph adder 20, albeit without showing the detail of the internal carry chain. The letter designations in the drawings represent words comprising multiple binary bits. For example, A and B are n-bit input words having bits at positions 0,1,2,3 . . . n–1.

It is presently preferred to use a prefix graph type adder from among those described for example in Knowles, *A Family of Adders*, Element 14, Bristol, UK. For each pair of input bits the circuit computes a generate bit (g=A AND B)—showing that addition of these two bits will generate a carry into the next stage. The circuit also computes propagate bit (p=A XOR B)—showing that these two bits will propagate any incoming carry through to the next bit and a kill bit (k=NOT(A OR B))—showing that these two bits will kill any incoming carry preventing it propagating any further up the carry chain.

It is possible to construct an adder by feeding either the g and k bits or the g and p bits into the carry chain segment. Usually we choose the former (g and k), since the original calculation of k is quicker than that for p, and this will be on the critical path through the carry chain.

As shown, a first addition stage 21 of the adder/incrementer 20 computes intermediate carry-into terms directly from the bits of the two input numbers A and B. In this example, the gates in this logic stage produce carry generate terms (g) for each of the input bit positions, carry propagate terms (p) for each of the input bit positions, and carry kill terms (k) for each of the input bit positions. Essentially, this first stage 21 processes pairs of bits from corresponding positions Am and Bm in the input words A and B to generate respective g, p and k terms. For example, for a 32-bit adder, A and B are 32-bits wide, and the stage 21 produces 32 bits (from positions 0,1,2,3 . . . 31) of g terms, 32 bits of p terms and 32 bits of k terms. Specifically, for each mth pair of input bits the input stage 21 computes for the carry into the next higher bit position (carry-into) an mth generate bit gm=Am AND Bm, an mth propagate bit pm=Am XOR Bm, and an mth kill bit km=NOT(Am OR Bm)).

The logic within the carry chain 23 computes final carry information with respect to each of the bit positions of the SUM of A and B, which in this case relates to the intended output of the circuit 20. The carry terms output by the carry chain 23 are referred to herein as "summation" carry terms. A variety of different types or classes of carry chain could be used. The preferred embodiments implement prefix graphs, within the class discussed in Knowles, *A Family of Adders*, Element 14, Bristol, UK. In the illustrated example, the first stage 21 supplies the generate (g) and kill (k) bits to the carry chain 23.

The carry chain 23 outputs generate bits G to an XOR gate array 25, as a function of the prefix computations. The G output includes a generate type summation carry term bit for each of the positions of the intended output of the addition. The XOR gates of array 25 also receive the respective carry propagate terms (p) computed from the inputs A and B in the first logic stage 21. Each bit m of the output SUM is calculated by a gate in the array 25, for XORing the propagate bit calculated from the input data at bit m (Pm) with the final generate bit Gm−1 produced by the carry chain 23, where the corresponding bit from the carry chain Gm=f (gm . . . 0,km−1 . . . 0).

Figure 2:
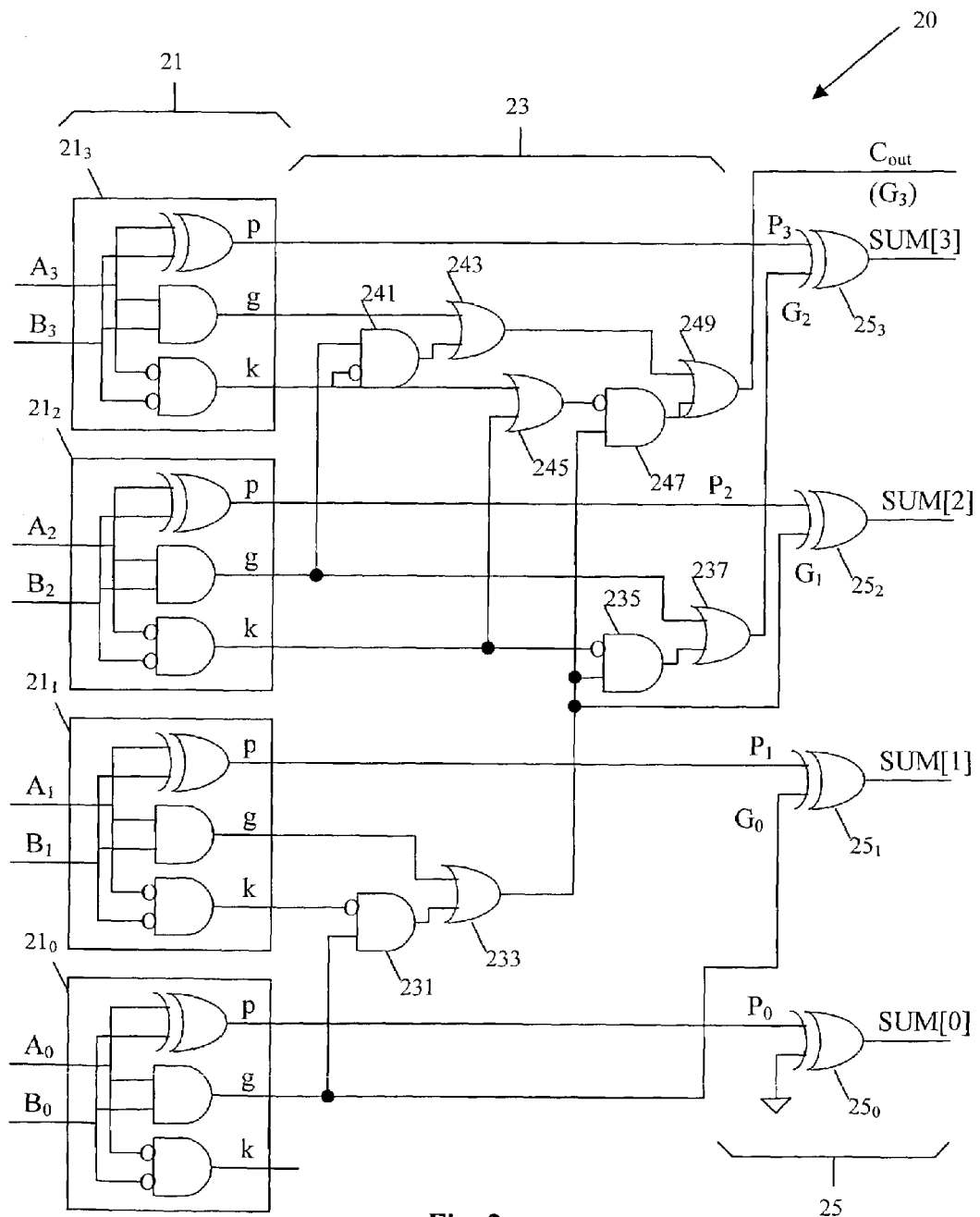
FIG. 2 is a block diagram of gate circuitry, for a 4-bit wide exemplary embodiment of an adder of the general type shown in FIG. 1

FIG. 2 is a logic circuit diagram of a simple example of an implementation of the adder 20. For ease of illustration and discussion, the example of the adder circuit 20 shown in of FIG. 2 is a 4-bit adder, that is to say, for adding two 4-bit numbers. Typical implementations of the invention, however, will provide adder-incrementer capabilities for 32-bit numbers, 64-bit and higher. The prefix type carry chain becomes particularly advantageous in terms of its circuit logic efficiency and low delay, as the chain is expanded to handle more bits.

FIG. 2 shows four logic blocks $21_0$ to $21_3$ forming the first stage 21 of the adder 20. Within each block, the logic includes an AND gate and an XOR gate for processing the respective bits from the numbers A and B. The AND gate produces the first level generate term (g), whereas the XOR gate produces the first level propagate term (p). The respective bits also are applied through inverters to another AND gate to produce the first level kill term (k).

In the adder 20, the propagate terms are passed directly to the XOR gates $25_0$ to $25_3$ that form the output stage 25. The logic blocks $21_0$ to $21_3$ pass respective generate (g) and kill (k) terms to the carry chain 23, as shown. The drawing provides one example of the prefix graph logic of the carry chain 23 for a simple 4-bit adder. The invention encompasses a variety of different chain structures within the class of prefix graph carry chains as well as other known types of carry chain structures.

In this simple example, the XOR gate $25_0$ receives the $P_0$ propagate term from the lowest order block $21_0$. The other input of the XOR gate $25_0$ connects to a binary 0 value. The binary output of the XOR gate $25_0$ represents the lowest order bit of the sum or "SUM[0]" in the drawing. The kill (k) term from the lowest order block $21_0$ is not used.

The XOR gate $25_1$ receives the $P_1$ propagate term from the next higher order block $21_1$. The other input of the XOR gate $25_0$ uses the generate (g) signal directly from the first block $21_0$ as the final generate term $G_0$. The binary output of the XOR gate $25_1$ represents the bit SUM[1] of the output sum.

The generate (g) term from the lowest order block $21_0$ also is applied to one input of an AND gate 231, which receives the inverse of the kill (k) term from the next higher block $21_1$. An OR gate 233 receives the output of the AND gate 231 as well as the generate (g) term from the block $21_1$ and produces the final generate term $G_1$. An XOR gate $25_2$ processes the generate term $G_1$ from the carry chain 23 and the $P_2$ term from the block $21_2$, to produce the binary output for the third bit position of the sum or "SUM[2]" in the drawing.

An AND gate 235 receives the $G_1$ signal from the OR gate 233. The AND gate 235 also receives the inverse of the kill (k) term from the next higher block, in this case the block $21_2$ for the third input bit position. An OR gate 237 receives the output of the AND gate 235 as well as the generate (g) term from the block $21_2$ and produces the final generate term $G_2$. An XOR gate $25_3$ processes the generate term $G_2$ from the carry chain 23 and the $P_3$ term from the block $21_3$. The binary output of the XOR gate $25_3$ represents the SUM[3] bit of the sum of A and B.

In this 4-bit example, the generate (g) term from the block $21_2$ also is applied to one input of an AND gate 241, which receives the inverse of the kill (k) term from the next higher block, in this case the highest order block $21_3$. An OR gate 243 receives the output of the AND gate 241 as well as the generate (g) term from the block $21_3$.

The block $21_3$ also supplies the kill (k) term to an OR gate 245. On its other input, OR gate 245 receives the kill (k) term from the block $21_2$. The output of the OR gate 245 is inverted and applied to one input of an AND gate 247. In that gate, the inverse of that signal from the OR gate 245 is ANDed with the $G_1$ generate signal received from the OR gate 233.

The OR gate 243 provides its output signal to one input of a further OR gate 249. The OR gate 249 also receives the output signal from the AND gate 247. The output of the OR gate 249 represents the final generate signal for the highest bit position, that is to say the $G_3$ signal. In this circuit, the $G_3$ signal represents the overall carry output $C_{out}$ of the adder 20.

Figure 3:
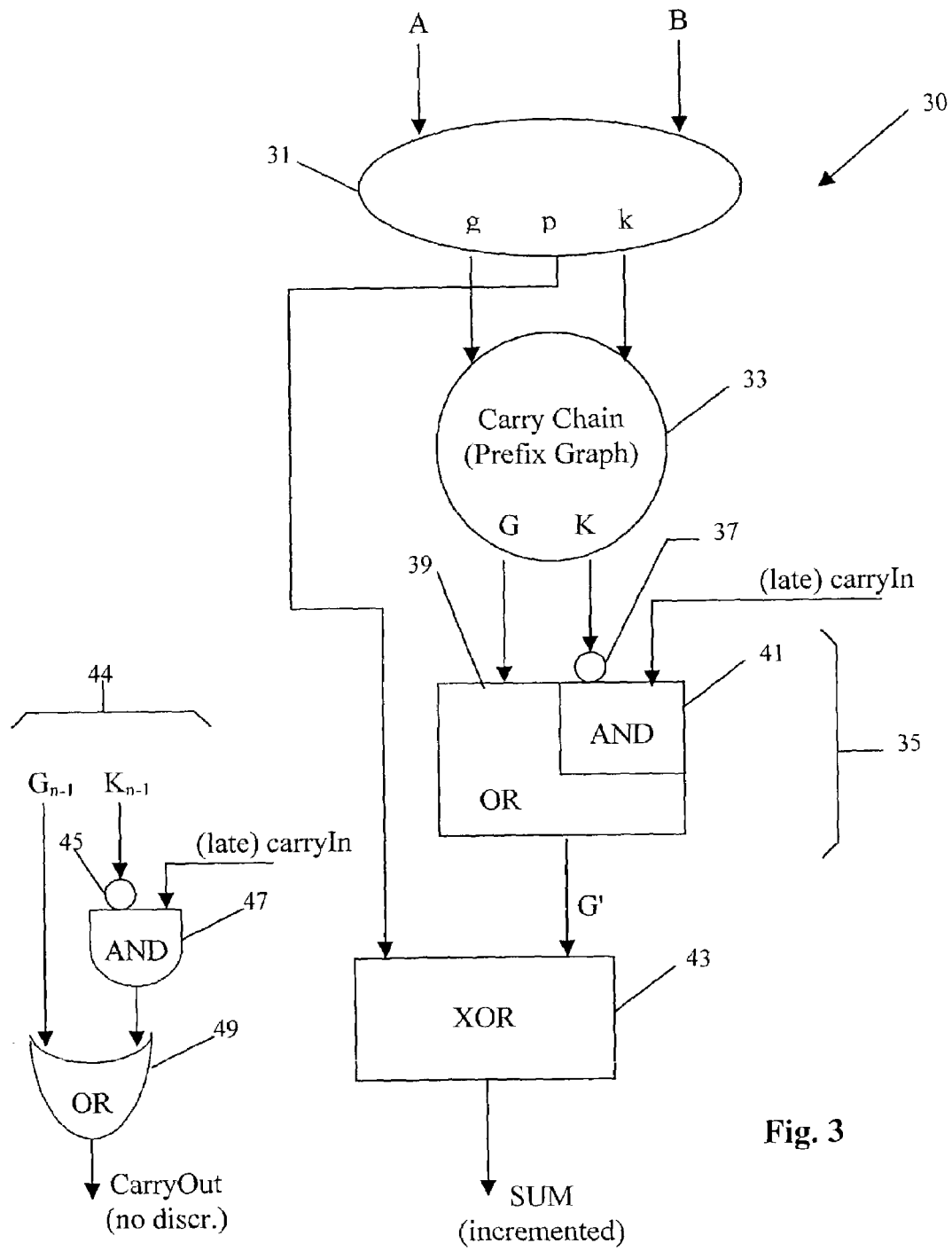
FIG. 3 is a logical/functional diagram of a prefix type late-incrementing adder circuit.

The combined adder/incrementer circuit 30 shown in FIG. 3 includes a first addition-logic stage circuit 31 for computing the sets of intermediate carry terms. Again, the first stage 31 preferably produces the carry generate terms (g) from each of the input bit positions, the carry propagate terms (p) from each of the input bit positions, and the carry kill terms (k) from each of the input bit positions, in the same manner as in the addition circuit of FIG. 1. For example, in a 4-bit wide embodiment, the first stage logic circuit 31 would comprise the blocks $21_0$ to $21_3$ shown in FIG. 2.

The embodiment of FIG. 3 includes a carry chain 33, similar to the carry chain in the adder of FIG. 1. In the combined circuit, the carry chain essentially computes relevant summation carry terms, that is to say carry control terms as they should relate to the sum of the two binary numbers without the increment function.

Inside the carry chain 33, the signal Km=f'(km . . . 0) is generated and used in the calculation of Gm. Usually this is not brought out to the end of the carry chain 23 (FIG. 3) because, as seen above, it is not required for the addition. However, the combined circuit 30 brings this series of terms out of the carry chain 33, to add the extra late conditional incrementing stage as described in more detail below.

Figure 4:
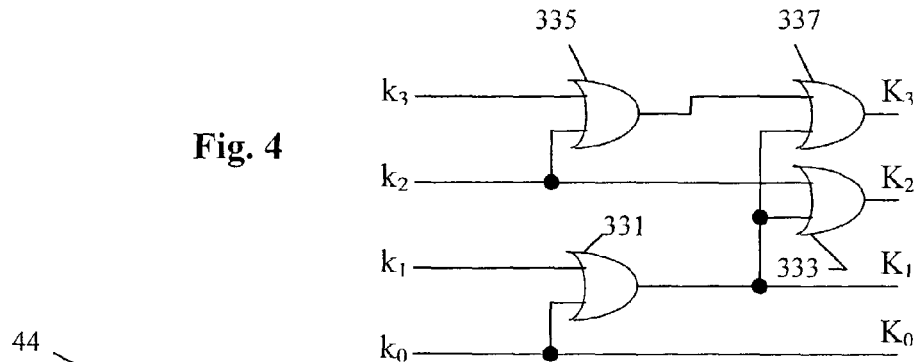
FIG. 4 is a block diagram of gate circuitry for use in the carry chain in a 4-bit wide exemplary embodiment of the circuit of FIG. 3, to produce carry kill signals for use in subsequent logic stages.

FIG. 4 shows the logic circuitry added to the carry chain to bring the carry kill terms (K) out from the chain 33, in a 4-bit adder-incrementer. Essentially, a 4-bit version of the chain 33 is the same as the chain 23 shown in FIG. 2 except for the addition of the circuit of FIG. 4. As shown, the $k_0$ term is used directly, as the final kill term $K_0$ for the first output bit position. A first OR gate 331 processes the $k_0$ and $k_1$ terms to produce the final kill term $K_1$ for the next output bit position. The kill term $K_1$ also is applied to another OR gate 333. The OR gate 333 processes the $K_1$ and $k_2$ terms to produce the final kill term $K_2$ for the next output bit position.

The kill terms $k_2$ and $k_3$ are applied to an OR gate 335. A further OR gate 337 receives the output of the gate 335 on one input and receives the kill term $K_1$ on its other input. The OR gate 337 produces the final kill term $K_3$, that is to say for the highest bit position in this 4-bit example.

Using the generate (G) and kill (K) terms from the carry chain 33, the embodiment of FIG. 3 generates a new signal G' for each bit position from a composite gate array or system 35. The second stage logic of the composite gate system 35 effectively controls whether the combined output should be the sum or the incremented sum, in response to the state of the late carryIn signal. This incrementer control logic responds to the summation carry terms (G and K in this example) and to the late carryIn type conditional increment signal to produce modified carry generate G' terms, as needed, so that the XOR gates 43 in the output stage will produce the correct one of these two possible results.

The bits of the signal G' relate to carry generate status of the ultimate output signal, which may be either the sum or the incremented sum, depending on the condition indicated by the increment (late carryIn) signal. As shown, the gate array 35 in this embodiment comprises a series of inverters 37 for processing the K terms (into NOT K terms). The gate array 35 also comprises AND gates 41 for AND-ing the outputs from the inverters 37 with the late carryIn bit. The G terms from the carry chain 33 are supplied to OR gates 39, for processing together with respective outputs of the AND gates 41, to thereby produce the G' terms.

Figure 5:
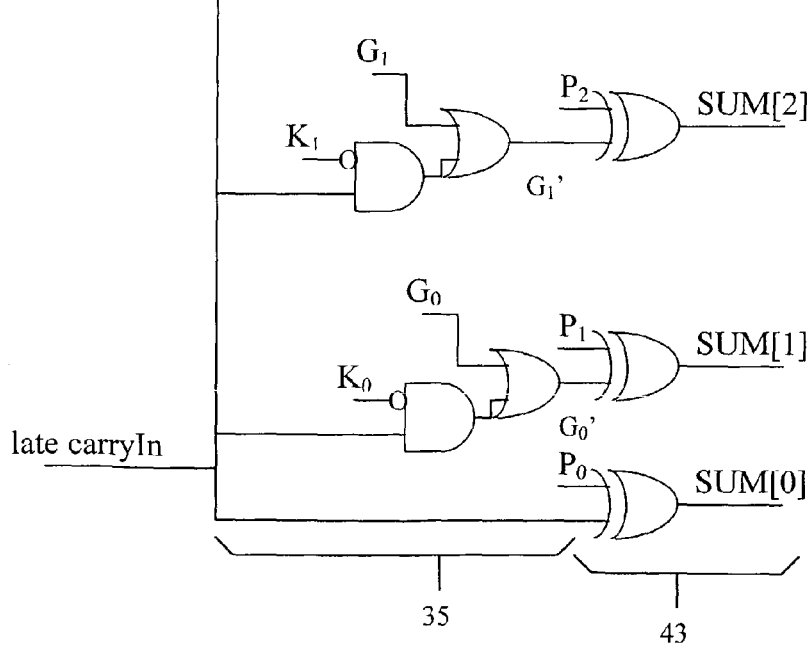
FIG. 5 is a block diagram of gate circuitry for use as the late carry processing stage and for generation of the conditionally incremented sum, in a 4-bit wide exemplary embodiment of the circuit of FIG. 3.

Each bit of the G' signal from the combination gate system 35 indicates whether a carry is generated into bit m of the output, either because a carry-bit has been generated in the addition or because the late carryIn has propagated through all bits from bit 0 up to bit m. The carry out bit for an N bit adder is G'(N−1), as shown in FIG. 5.

The gate system 35 outputs generate bits G' to an XOR gate array 43, as a function of the prefix computations in the carry chain 33 and the logical processing of the G and K signals together with the late carryIn bit by the system 35. The G' output includes a bit for each of the positions of the intended output of the circuit 30. The XOR gates of array 43 also receive the respective carry propagate terms (p) computed from the inputs A and B in the first logic stage 31.

In this circuit, the gate system 35 together with the gate array 43 form a SUM based on the addition and conditional incrementing operation. Each bit m of the output SUM is calculated by a gate in the array 43, for XORing the propagate bit calculated from the input data at bit m (Pm) with the respective final generate bit of G'.

The binary state (0 or 1) of the carryIn signal determines the condition needed for the incrementing of the addition sum. For example, the sum is incremented by 1 if the late carryIn has a value of 1. If the late carryIn has a value of 0, then there is no incrementing, and the circuit 30 outputs the sum of A and B.

FIG. 5 shows the separate AND gates and OR gates forming the combined system 35, for our simple 4-bit example. This drawing also shows the separate gates of the array 43 for the 4-bit circuit.

The circuit 30 (FIG. 3) may produce only the conditionally incremented SUM output. The highest order bit of the G signal set may be used as an indication of whether or not the addition alone would generate a carry. If a particular application requires output of an associated CarryOut bit, for the resultant SUM, the circuit may utilize logic system 44. The circuit 44 processes the carryIn signal, as well as the highest order bit signals output by the carry chain 33, although the interactions thereto are omitted for ease of illustration.

As shown, the highest order output kill (K) bit or $K_{n-1}$ bit is supplied from the carry chain 33 through an inverter 45 to one input of an AND gate 47. The AND gate 47 also receives the late carryIn bit signal. An OR gate 49 receives the result from the AND gate 47 as well as the highest order output generate (G) bit or $G_{n-1}$ bit. The OR gate 49 outputs a single-bit CarryOut signal in association with the conditionally incremented SUM. However, this CarryOut signal could result from either the addition or the incrementing function. Although shown as a separate set of gates for convenience, in practice, this function can be performed by gates within the system 35 for processing the late carryIn signal relative to the highest order bit position, and simply tapping the highest order output bit of G' for this carry signal output.

The embodiments of FIGS. 6 to 12 include additional logic to generate an output signal indicative of the cause of the overall carry output associated with the conditional incremented sum. In the embodiments, the derived output signal is a CarryOut signal, which is dependent on the incrementing function, that is to say, this signal indicates a CarryOut (true) if an incrementing operation caused the carry.

Thus embodiments of the invention implemented by these circuits effectively process two binary numbers, each consisting of a predetermined number of bits, so as to add *the numbers, and preferably so as to conditionally increment a sum of the binary numbers. The processing provides an associated carry indication signal. The mode of operation involves processing the binary numbers to perform a carry chain computation relating to summation of the numbers. This processing produces summation carry terms, for example generate (G), propagate (P) or kill (K) terms with regard to the bit positions of the sum of the two numbers. In response to a first value of an increment signal, the method outputs the sum of the binary numbers. In response to a second value of the increment signal, the method outputs the incremented sum of the numbers. In accord with embodiments of the invention, the technique includes a further logical operation on one of the summation carry terms and the increment signal. This last operation generates a signal based on whether or not generation of the incremented sum produced a carry.

Figure 6:
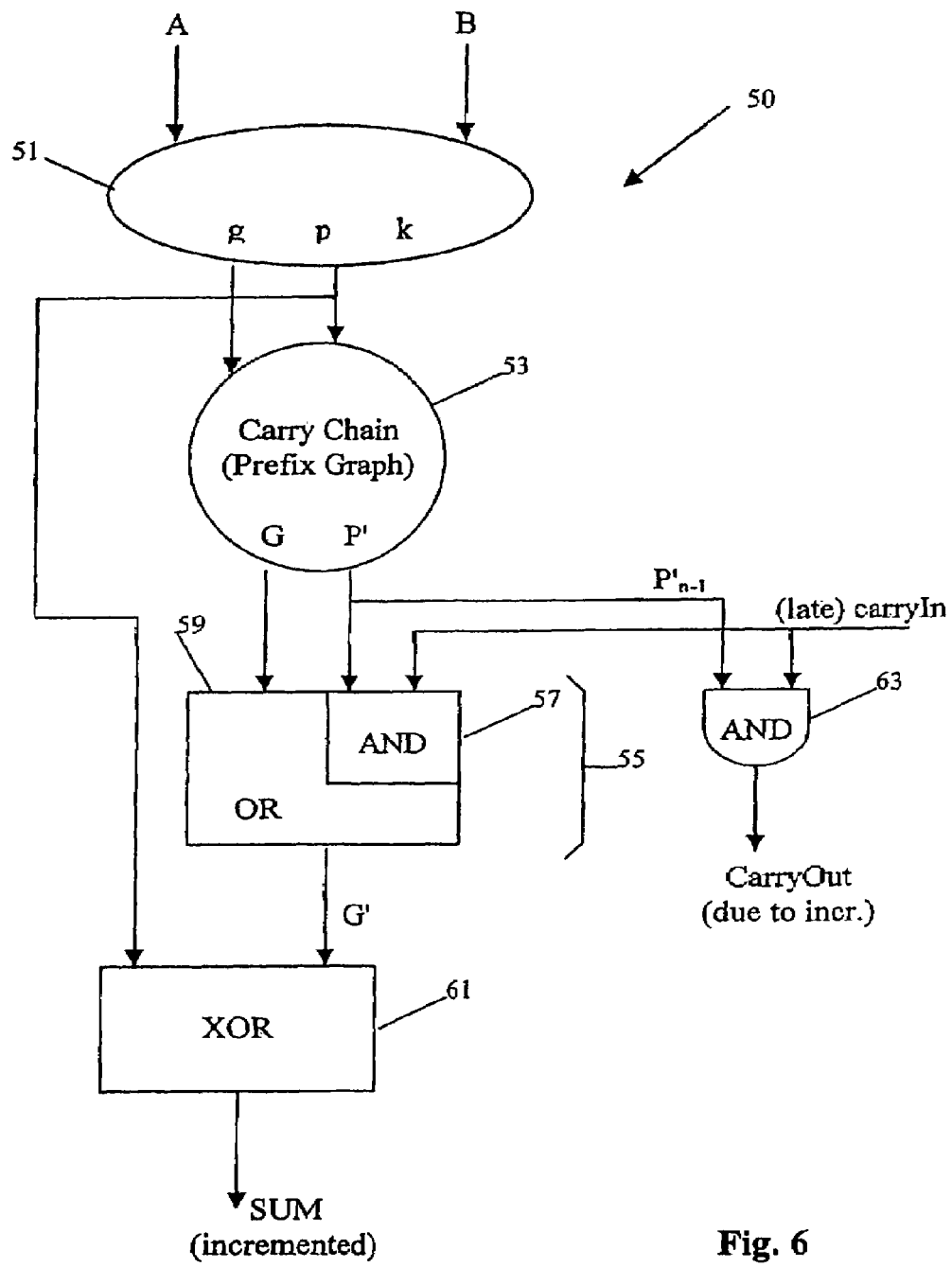
FIG. 6 is a logical/functional diagram of a first embodiment of a prefix type late-incrementing adder circuit with logic added to discriminate the final CarryOut, in accord with the invention.

FIG. 6 shows the high-level logic of a first embodiment of a prefix type late-incrementing adder circuit, with the added logic to discriminate the final CarryOut due to the incrementer function, specifically based on processing of G and P signals from the carry chain. A detailed example of a logic circuit implementation of this adder/incrementer will be discussed, later, with regard to FIGS. 7 to 9.

The combined adder/incrementer circuit 50 shown in FIG. 6 includes a first addition stage 51 for computing the carry generate terms (g) for each of the bits, carry propagate terms (p) for each of the bits, and carry kill terms (k) for each of the bits, similar to those in the earlier drawings. The first stage outputs the p terms to the XOR gate array 61 in the output stage, as part of the calculation of the SUM (incremented) output, as in the circuit of FIG. 3.

This embodiment (FIG. 6) includes a prefix graph type carry chain 53, which is similar to the carry chain in the earlier circuits, except that carry chain 53 uses the g and p terms from the stage 51. The k terms are not used, so the logic for producing those terms may be omitted from the actual impelementation of the stage 51. The carry chain 53 outputs the G and P'signals. Inside the carry chain 53, the signal Pm=f''(pm . . . 0) is generated and used in the calculation of Gm, and it is brought out for the subsequent use in the incrementing function.

Figure 7:
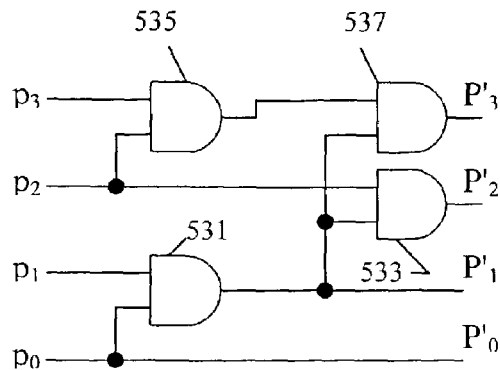
FIG. 7 is a block diagram of gate circuitry for use in the carry chain in a 4-bit wide exemplary embodiment of the circuit of FIG. 6, to produce carry propagate signals for use in subsequent logic stages.

FIG. 7 shows the logic circuitry added to the carry chain to bring the carry propagate terms (P) out from the chain 53. Essentially, a 4-bit version of the chain 53 is the same as the chain 23 shown in FIG. 2 except for the addition of the circuit of FIG. 7. As shown, the $p_0$ term is used directly, as the final propagate term $P'_0$ for the first output bit position. A first AND gate 531 processes the $p_0$ and $p_1$ terms to produce the final propagate term $P'_1$ for the next output bit position. The propagate term $P'_1$ also is applied to another AND gate 533. The AND gate 533 processes the $p_1$ and $p_2$ terms to produce the final propagate term $P'_2$ for the next output bit position.

The propagate terms $p_2$ and $p_3$ are applied to an AND gate 535. A further AND gate 537 receives the output of the gate 535 on one input and receives the propagate term $P'_1$ on its other input. The AND gate 537 produces the final propagate term $P'_3$ for the next output bit position, that is to say for the highest bit position in this 4-bit example.

The embodiment of FIG. 6 generates the new signal G' for each bit position from a composite gate array 55. This second stage logic section serves to control the conditional incrementing function, so that the circuit 30 outputs either the sum or the incremented sum in response to the conditional increment signal (late) carryIn.

As shown, the gate array 55 comprises AND gates 57 for AND-ing the P' outputs from the carry chain 53 with the late carryIn bit. The G terms are supplied to OR gates 59, for processing together with respective outputs of the AND gates 57. Each bit of the G' signal from the combination gate system 55 indicates whether a carry is generated from a bit position m into the next higher bit position of the resultant number, either because a carry-bit has been generated in the addition or because the late carryIn has propagated through all bits from bit 0 up to bit m.

The gate system 55 outputs generate bits G' to an XOR gate array 61 forming the final output stage logic, as a function of the prefix computations in the carry chain 53 and the logical processing of the G and P' signals together with the late carryIn bit by the system 55. The G' output includes a bit for each of the positions of the intended output of the circuit 50. As noted, the XOR gates of array 61 also receive the respective carry propagate terms (p) computed from the inputs A and B in the first logic stage 51.

In this circuit 50, the gate system 55 together with the gate array 61 form a SUM for the output of the circuit 50, based on the addition and the conditional incrementing operation. Each bit m of the output SUM is calculated by a gate in the array 61, for XORing the propagate bit calculated from the input data at bit m (Pm) with the respective final generate bit of G'.

Figure 8:
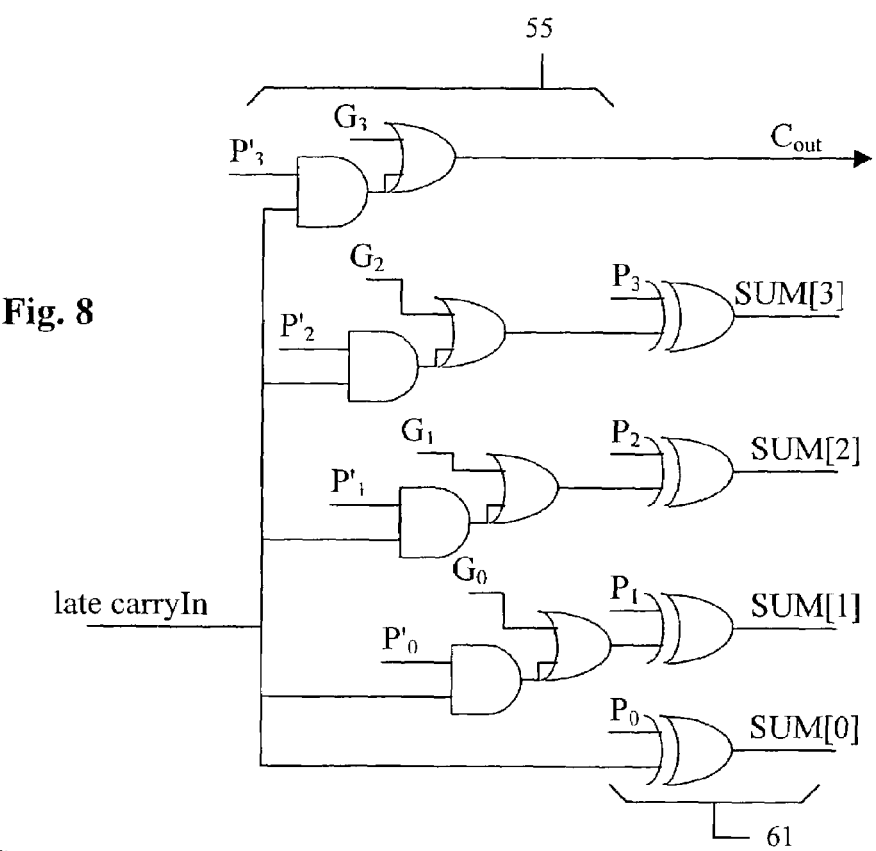
FIG. 8 is a block diagram of gate circuitry for use as the late carry processing stage and for generation of the conditionally incremented sum, in a 4-bit wide exemplary embodiment of the circuit of FIG. 6.

FIG. 8 shows the actual gates of the combined gate system 55, for the 4-bit adder version of the adder-incrementer circuit 50. This drawing also shows the separate gates of the array 61. As shown, the $P'_0$ bit and the late carryIn signal are applied directly to the XOR gate for the lowest bit position, to form the lowest order bit SUM[0] of the conditionally incremented output sum.

A respective AND gate performs an AND operation on the bits $P'_0$ to $P'_3$ of the P' output from the carry chain 53 with the value of the late carryIn signal. A respective OR gate processes the outputs of the respective AND gate, relative to the appropriate $G_0$ to $G_3$ bit from the carry chain. Although not shown in FIG. 8, the outputs of the OR gates form the bits $G'_0$ to $G'_3$ representing the generate (G') signals with regard to the conditionally incremented sum. The lower bits of the G' signal are applied to the XOR gates of the array 61.

The circuit 50 may produce only the conditionally incremented SUM output. If a particular application requires output of an associated CarryOut bit, for the resultant SUM, the circuit may include additional logic to generate an overall CarryOut signal, where the carry may be generated by either the addition or the incrementing. In accord with this embodiment of the invention, there is included AND gate 63, which generates a CarryOut signal, where the carry output is due to the incrementing operation.

Specifically, the final propagate bit $P'_{n-1}$ is supplied to an AND gate 63, which also receives the one-bit late carryIn signal. The binary state (0 or 1) of the carryIn signal determines the condition needed for the incrementing of the addition sum. For example, the sum is incremented by 1 if the late carryIn has a value of 1. If the late carryIn has a value of 0, then there is no incrementing, and the circuit outputs the sum of A and B. The AND gate 63 produces the CarryOut signal from the late carryIn (due to the increment function), only if the propagate signals p(m−1) . . . p(0) are all set, indicating that any carry entered into the bottom bit will be carried all the way up to the carry out terminal.

Figure 9:
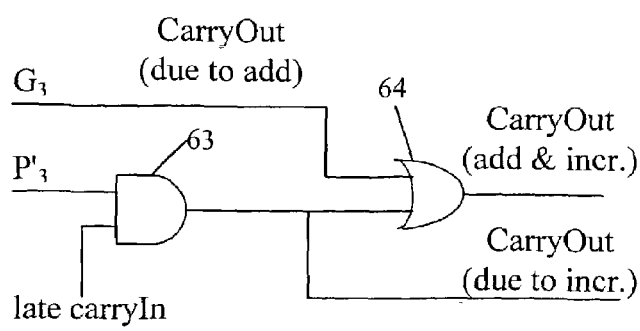
FIG. 9 is a block diagram of gate circuitry for generation of carry output signals in or in combination with a 4-bit wide exemplary embodiment of the circuit of FIG. 6.

If an overall CarryOut is desired (due to adding and incrementing), the signal from the gate 63 may be applied to a further OR gate 64 (FIG. 9). The OR gate 64 also receives the highest order generate (G) bit, in the 4-bit example, the $G_3$ bit. This bit indicates whether the 4-bit addition operation produced a carry out to the next higher bit order. The result of this last OR operation will indicate a CarryOut if the addition produced a carry or the increment produced a carry.

A comparison of FIG. 9 to FIG. 8 shows that the $C_{out}$ signal of FIG. 8 is the same as that output from the gate 64 of FIG. 9. As such, an actual implementation could use the appropriate gates within the array 55 to process the bits so as to generate the desired carry indication signal. To derive desired CarryOut signal from the late carryIn (due to the increment function), it would be possible to pick the output signal of the AND gate processing the highest bit of the P' signals, that is to say processing the P'3 signal in the example of FIG. 8.

Figure 10:
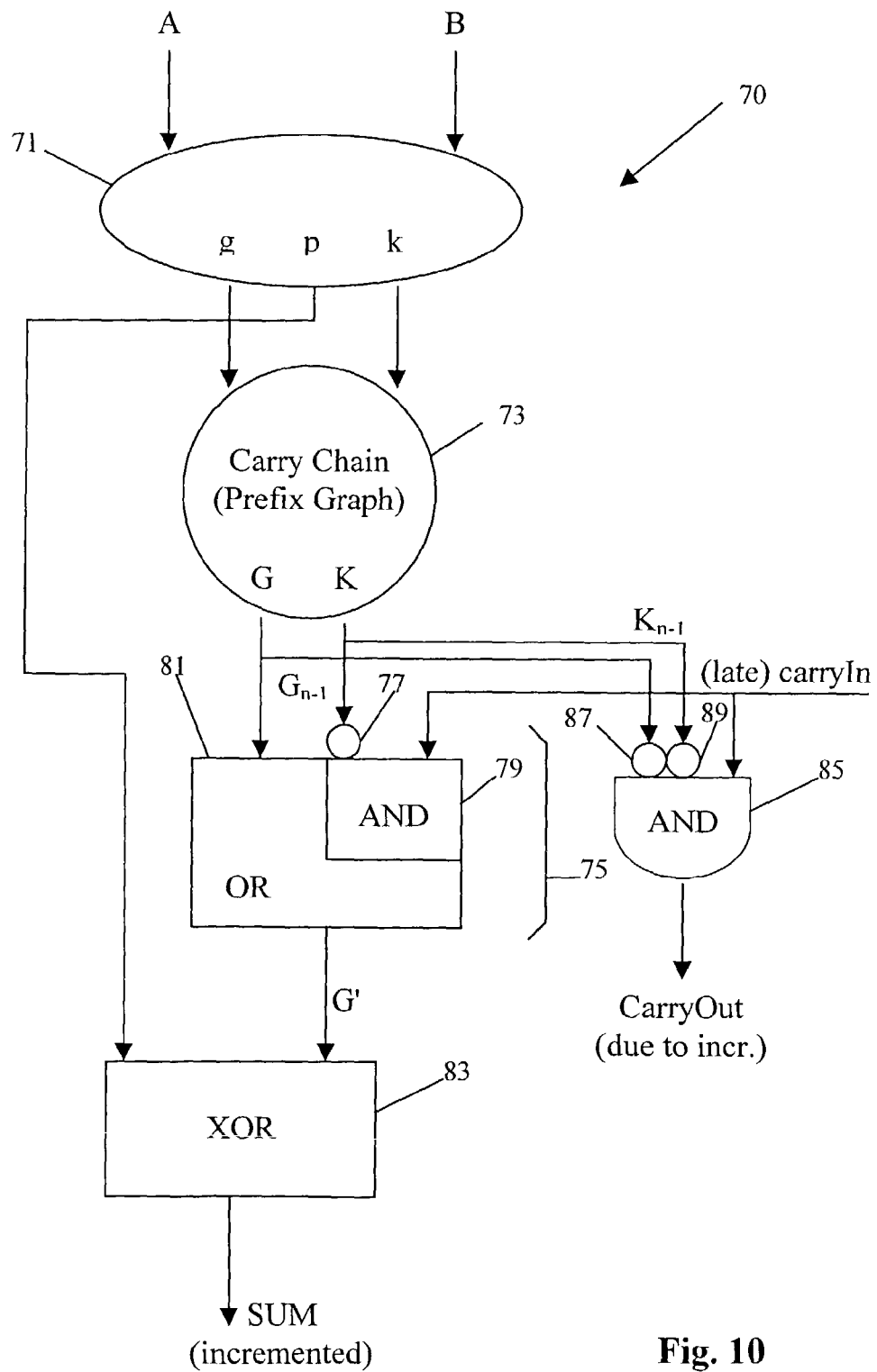
FIG. 10 is a logical/functional diagram of a second embodiment of a prefix type late-incrementing adder circuit with logic added to discriminate the final CarryOut, in accord with the invention.

FIG. 10 shows the high-level logic of a second embodiment of a prefix type late-incrementing adder circuit, with the added logic to discriminate the final CarryOut due to the incrementer function, specifically based on processing of G and K signals from the carry chain. It is preferred to build adders with a prefix graph based on the K and G bits, because these have a slight advantage in computation speed of the initial values. It is possible to use substantially the same arrangement as in FIG. 6, but replacing the P' signal into the AND gate 57 with a NOT(K) signal. The carry produced is still a function of the addition as well as the increment operation. In this case the carry out produced is effectively Cout(increment) OR Cout(addition). Since we know that Cout(addition) for any bit is actually the G output for that bit from the prefix graph we can cancel out this extra term by ANDing NOT(G) with the NOT(K) and late carryIn, as shown in FIG. 10. To insure a complete understanding, it may be helpful to discuss that circuit in detail.

The combined adder/incrementer circuit 70 shown in FIG. 10 includes a first addition stage 71 for computing the carry generate (g), carry propagate (p) and carry kill (k) terms from each respective pair of the input bits, similar to those in the earlier drawings. In a 4-bit embodiment for example, the stage 71 would use logic blocks similar to the blocks $21_0$ to $21_3$ in the adder of FIG. 2. The first stage 71 outputs the p terms to the XOR gate array 83 forming the final output stage logic, which forms the conditionally incremented SUM output, as in the earlier circuits.

This embodiment (FIG. 10) includes a prefix graph type carry chain 73, which is similar to the carry chain in the circuit of FIG. 3. Here, the carry chain 73 uses the g and k terms from the stage 71. The carry chain 73 outputs the G and K signals, based on prefix-graph type processing of the g and k input terms. In a 4-bit embodiment, for example, the structure of this carry chain 73 could be similar to the carry chain 23 (FIG. 2) with the extra logic (FIG. 4) added to bring out the kill terms.

This embodiment (FIG. 10) generates the new signal G' for each bit position from a composite gate array 75. This second stage logic section serves to control the conditional incrementing function, so that the circuit 70 outputs either the sum or the incremented sum in response to the increment signal (late) carryIn. The logic of the stage 75 is essentially the same as that used in the stage 35 in the embodiment of FIG. 3. In a 4-bit embodiment for example, the structure of the logic stages 75 and 83 for producing the G' terms and the conditionally incremented SUM would be essentially as shown in FIG. 5.

As shown in high-level form in FIG. 10, the gate array 75 comprises inverters 77, AND gates 79 and OR gates 81. The AND gates 79 receive the respective bits inverted from the K terms output by the carry chain 73 at one set of inputs, and those gates all receive the late carryIn bit value on their respective second inputs. The G terms are supplied to OR gates 81, for processing together with respective outputs of the AND gates 79. Each bit of the G' signal from the combination gate system 75 indicates whether a carry is generated from bit position m into the next higher bit position of the resultant number, either because a carry-bit has been generated in the addition or because the late carryIn has propagated through all bits from bit 0 up to bit m.

The gate system 75 outputs generate bits G' to an XOR gate array 83, as a function of the prefix computations in the carry chain and the logical processing of the G and K signals together with the late carryIn bit by the system 75. The G' output includes a bit for each of the positions of the intended output of the circuit 70. The highest order bit of the G' signals may be used, if it is desired to output an absolute carry output with the incremented SUM, that does not discriminate the cause of the carry.

As noted, the XOR gates of array 83 also receive the respective carry propagate terms (p) computed from the inputs A and B in the first logic stage 71. In this circuit 70, the gate system 75 together with the gate array 83 form a SUM based on the addition and the conditional incrementing operation. Each bit m of the output SUM is calculated by a gate in the array 83, for XOR-ing the propagate bit calculated from the input data at bit m (Pm) with the respective final generate bit of G'.

This embodiment also includes an AND gate 85, which generates a CarryOut signal, where the carry output is due the incrementing operation. Specifically:

CarryOut=(Cout(incrementer) OR Cout(addition))
AND NOT(Cout(addition))

This is a redundant function, which expresses the fact that if a carry out or overflow were caused by the addition then it is not possible to cause another carry out by simply incrementing the result. Building the circuit in this way is advantageous because the expression (Cout(incrementer) OR Cout(addition)) is available virtually free by ANDing NOT(K) from the outputs of the existing prefix graph carry chain 73 with the late carry input required for the incrementing function. To correct the result we then have to AND in the NOT(G) signal as well to cancel out any carry due to the addition. The extra gates evaluate in parallel with the normal late increment and final sum computation.

In our simple 4-bit circuit example, this logic could be implemented as shown in FIG. 11. The highest order G bit from the carry chain 73, that is to say the $G_3$ bit in our example, is applied through an inverter 91 to a first input of an AND gate 93. The $G_3$ bit represents the CarryOut signal derived solely from an addition of 4-bit numbers A and B.

The highest order K bit from the carry chain 73, that is to say the $K_3$ bit in our example, is applied through an inverter 95 to a first input of an AND gate 97.

An OR gate 99 processes the output of the AND gate 97 as well as the $G_3$ bit, to produce a CarryOut signal, where the carry function may have resulted from either the addition or the conditional incrementing. The output of the OR gate 99 goes directly to the other input of the AND gate 93. Thus, the AND gate 93 processes the inverse of the CarryOut signal due to addition and the CarryOut signal that may be based on either addition or incrementing. The output of the AND gate 93 is a CarryOut signal, where the carry result is due only to the incrementing function.

Because of the redundancies, however, it is possible to reduce the logic needed to derive the CarryOut signal, where the carry result is due only to the incrementing function, to a single three-input AND gate 85 with two inverters 87 and 89 (see FIGS. 10 and 12). As shown, the inverter 87 inverts the highest order bit from the generate (G) terms output by the carry chain 73, identified as $G_{n-1}$ in FIG. 10 or $G_3$ in FIG. 12. The inverter 89 inverts the highest order bit from the kill (K) terms output by the carry chain 73, identified as the $K_{n-1}$ bit in FIG. 10 or the $K_3$ bit in FIG. 12. The gate 85 ANDs the inverted values from the $G_{n-1}$ ($G_3$) bit and the $K_{n-1}$ ($K_3$) bit together with the bit value of the late carryIn signal. The output of the AND gate 85 is the CarryOut signal due to the incrementing function.

Those skilled in the art will recognize that the present invention has a broad range of applications, and the embodiments admit of a wide range of modifications, without departure from the inventive concepts. For example, the illustrated embodiments applied the advantageous carry determination techniques to adders with conditional incrementer functionality. The inventive carry determination may be applied to adders with an associated increment by 1 function, or to adders with multiple increment functions (conditional or not). Also, the preferred embodiments utilize carry chains based on prefix graph type circuit implementations. Those skilled in the art will recognize that the adder/incrementer circuits in accord with the present invention may utilize other types of carry chains.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A circuit for adding a first binary number to a second binary number and conditionally generating an incremented sum of the first and second binary numbers, the circuit comprising:
   a carry chain of logic circuits for producing two sets of summation carry terms relative to bit positions of a sum of the first and second binary numbers;
   at least one output stage logic circuit, coupled to outputs of the carry chain, for logically processing the two sets of summation carry terms with respect to a value of a conditional increment signal and an intermediate carry term, to selectively output either one of: the sum of the first and second binary numbers, and the incremented sum of the first and second binary numbers based on the value of the conditional increment signal; and
   a carry-logic gate for logically processing the value of the conditional increment signal and a predetermined bit of at least one of the two sets of summation carry terms from the carry chain, to produce a carry output signal dependent on a carry result if any is generated by incrementing of the sum of the first and second binary numbers.

2. The circuit as in claim 1, wherein the logic circuits of the carry chain are arranged to implement a prefix graph carry functionality.

3. The circuit of claim 1, further comprising a preliminary stage of logic gates for processing the first and second binary numbers to produce intermediate carry terms and supplying the intermediate carry terms to drive the carry chain.

4. The circuit as in claim 3, further comprising:
   a second stage logic circuit, coupled to outputs of the carry chain, for logically processing the two sets of summation carry terms with respect to a value of said conditional increment signal, to produce a set of output carry signals with respect to bit positions of the incremented sum of the first and second binary numbers; and
   output logic gates for combining the set of output carry signals with a set of intermediate carry terms from the preliminary stage of logic gates to generate an output related to the sum of the first and second binary numbers.

5. The circuit as in claim 4, wherein said carry output signal distinguishes a cause of a carry generation with respect to the output related to the sum of the first and second binary numbers.

6. The circuit as in claim 5, wherein the carry-logic gate produces a CarryOut signal due to the sum of the first and second binary numbers.

7. The circuit as in claim 5, wherein:
   the output stage logic circuit outputs the sum of the first and second binary numbers if the conditional increment has a first value, or the sum of the first and second binary numbers incremented by 1 if the conditional increment has a second value.

8. The circuit as in claim 7, wherein the at least two intermediate carry terms are selected from the group consisting essentially of: carry generate (g), carry propagate (p) and carry kill (k).

9. The circuit as in claim 8, wherein:
   the carry chain receives sets of carry generate terms (g) and carry propagate terms (p) from the preliminary stage of logic gates;
   the carry chain processes the received carry generate terms (g) and carry propagate terms (p) to produce a set of summation carry generate terms (G) and a set of summation carry propagate terms (P) as the two sets of summation carry terms relative to bit positions of the sum of the first and second binary numbers; and
   the carry-logic gate comprises an AND gate for AND-ing the binary signal signifying a conditional increment with respect to a highest order one of the summation carry propagate terms (P) from the carry chain.

10. The circuit as in claim 8, wherein:
    the carry chain receives sets of carry generate terms (g) and carry kill terms (k) from the preliminary stage of logic gates;
    the carry chain processes the received carry generate terms (g) and carry kill terms (k) to produce a set of summation carry generate terms (G) and a set of summation carry kill terms (K) as the two sets of summation carry terms relative to bit positions of the sum of the first and second binary numbers; and
    the carry-logic gate comprises an AND gate for AND-ing the binary signal signifying a conditional increment with respect to: an inverse of a highest order one of the summation carry generate terms (G) from the carry chain and an inverse of a highest order one of the summation carry kill terms (K) from the carry chain.

* * * * *

UNITED STATES PATENT AND TRADEMARK OFFICE
CERTIFICATE OF CORRECTION

| | | |
|---|---|---|
| PATENT NO. | : 7,139,789 B2 | Page 1 of 1 |
| APPLICATION NO. | : 10/252045 | |
| DATED | : November 21, 2006 | |
| INVENTOR(S) | : Richard J. Evans | |

It is certified that error appears in the above-identified patent and that said Letters Patent is hereby corrected as shown below:

On The Title Page:
Title Page, Item [54], please replace "ADDER INCREMENT CIRCUIT" with --ADDER INCREMENTER CIRCUIT--.

Signed and Sealed this

First Day of May, 2007

JON W. DUDAS
*Director of the United States Patent and Trademark Office*